United States Patent
Völcker et al.

(10) Patent No.: US 12,348,737 B2
(45) Date of Patent: Jul. 1, 2025

(54) METHODS OF ADDING AND VALIDATING A DIGITAL SIGNATURE IN A VIDEO DATA SEGMENT

(71) Applicant: Axis AB, Lund (SE)

(72) Inventors: Björn Völcker, Lund (SE); Stefan Lundberg, Lund (SE)

(73) Assignee: AXIS AB, Lund (SE)

( * ) Notice: Subject to any disclaimer, the term of this patent is extended or adjusted under 35 U.S.C. 154(b) by 365 days.

(21) Appl. No.: 17/980,150

(22) Filed: Nov. 3, 2022

(65) Prior Publication Data

US 2023/0188732 A1    Jun. 15, 2023

(30) Foreign Application Priority Data

Dec. 10, 2021   (EP) .................................. 21213608

(51) Int. Cl.
*G06F 21/62*   (2013.01)
*G06F 21/64*   (2013.01)
(Continued)

(52) U.S. Cl.
CPC ....... *H04N 19/172* (2014.11); *G06F 21/6209* (2013.01); *G06F 21/64* (2013.01); *H04L 9/3247* (2013.01)

(58) Field of Classification Search
CPC ............. H04N 19/172; H04N 21/2351; H04N 21/4223; H04N 21/64715; H04N 21/64784; H04N 21/835; H04N 7/18; H04N 21/2347; H04N 21/235; H04N 21/23614; H04N 21/4348; H04N 21/435; H04N 21/4405; H04N 21/845; G06F 21/6209; G06F 21/64; G06F 21/1063; G06F 21/16; H04L 9/3247; H04L 63/126; H04L 63/123
See application file for complete search history.

(56) References Cited

U.S. PATENT DOCUMENTS 8,875,202 B2    10/2014  Sanders
2007/0220260 A1   9/2007  King
(Continued)

FOREIGN PATENT DOCUMENTS

KR        20160142741 A      12/2016

OTHER PUBLICATIONS

Korean Office Action issued on May 1, 2025 for Korean Patent Application No. 10-2022-0168703.

*Primary Examiner* — Juan M Guillermety
(74) *Attorney, Agent, or Firm* — Volpe Koenig

(57) ABSTRACT

A method for verifying a digital signature in a video data segment generated by a video delivery chain comprises: obtaining the video data segment comprising encoded image frames and a plurality of node device datasets associated with respective labels; wherein one or more node device datasets include respective digital signatures; wherein the one or more node device datasets comprises a first node device dataset which includes a first digital signature generated by a first node device based on a first number of node device datasets that have been last added to the video data segment before the first node device dataset; locating the labels; identifying, using the labels, the first number of node device datasets; and verifying the first digital signature. The application also discloses a method of adding a digital signature to a video data segment.

16 Claims, 8 Drawing Sheets

(51) Int. Cl.
*H04L 9/32* (2006.01)
*H04N 19/172* (2014.01)

(56) References Cited

U.S. PATENT DOCUMENTS

| | | |
|---|---|---|
| 2008/0244739 A1 | 10/2008 | Liu et al. |
| 2010/0281263 A1* | 11/2010 | Ugawa ............... H04N 21/4334 |
| | | 713/181 |
| 2014/0032913 A1 | 1/2014 | Tenenboym et al. |
| 2018/0124048 A1 | 5/2018 | Yoo |
| 2018/0253567 A1 | 9/2018 | Gonzalez-Banos et al. |
| 2021/0182806 A1 | 6/2021 | Ornelas et al. |
| 2021/0287322 A1 | 9/2021 | Yaffe et al. |

* cited by examiner

METHODS OF ADDING AND VALIDATING A DIGITAL SIGNATURE IN A VIDEO DATA SEGMENT

FIELD OF INVENTION

The present disclosure relates to the field of digital signatures for video. In particular, it proposes methods for digitally signing and verifying digital signatures of a video data segment.

TECHNICAL BACKGROUND

Video data is made up by ordered sequences of image or video frames, often accompanied by metadata that provides information that is related to the video. Video data may be acquired for different purposes, including monitoring or surveillance purposes. It is increasingly important to be able to trust that video data is authentic in order to detect tampering, especially for surveillance video. One possible tampering approach is to add, remove or change image data of a video sequence. A consequence of such tampering is that a person may appear to have been present or not present at a camera monitored place. The metadata form additional data to the image frames. Metadata may be added by node devices of a video delivery chain. A video delivery chain may comprise an initial video capturing device and following node devices that each adds additional data to video data segments. The additional data may contain, for example, time stamps, position data, or hardware data such as camera model or firmware version. These data may also be exposed to tampering. For example, by changing a time stamp, the timing of a certain event at a monitored place may be adjusted. When video data are used for evidence purposes, for example in a court or in crime investigations, it is crucial that the video frames and important additional data can be trusted. Thus, there is a need for methods for validating segments of video data, also referred to as video data segments herein.

For video data segments that are generated by multiple node devices in a linear video delivery chain, it is desirable to validate not only the encoded image frames therein but also other data that have been added to the video data segments by node devices of the video delivery chain. For example, a video data segment with encoded image frames is generated by a video capturing device in a surveillance camera and signed before being transmitted from the camera. A video management system (VMS) receives the video data segments and adds metadata to the video data segments comprising time stamps for the encoded image frames. If the metadata is not signed, anyone can tamper with the metadata to adjust or remove the time stamps. A solution to this problem is that the VMS signs the metadata, i.e., generates a digital signature based on the metadata.

However, there is still a need for improvement of validation of video data segments that is generated by multiple node devices of a video delivery chain to make the validation more reliable.

SUMMARY

An aim of the present disclosure is to provide methods for reliable validation of both encoded image frames and additional data, such as metadata, in a video data segment that is generated by a video delivery chain having several node devices. In particular, the disclosure provides methods of adding additional data to the video data segment at different node devices such that the additional data can be validated to be true and to belong to, i.e., be coupled to, the video data segment.

One way to create a coupling to other parts of the video data segment is to sign the additional data based on also other parts of the video data segment than the additional data. By introducing a condition that additional data of the video data segment should be signed based on further parts of the video data segment, the additional data cannot be removed or replaced with other data. However, when verifying a signature that is generated according to this condition, a validation process needs to know which data in the video data segment that the signature is generated based on. Otherwise, the validation process cannot verify the signature correctly and the additional data cannot be validated. The disclosure proposes methods of how to generate signatures for additional datasets generated at different node devices in the video delivery chain, and corresponding methods of verifying the signatures.

The disclosure is defined by the appended claims.

According to a first aspect of the disclosure, there is provided a method for verifying a digital signature in a video data segment.

According to a second aspect of the disclosure, there is provided a method for adding a digital signature to a video data segment.

According to a third aspect of the disclosure, there is provided a non-transitory computer readable storage medium having stored thereon instructions for implementing the method according to the first aspect or the second aspect, when executed on a device having processing capabilities.

According to a fourth aspect of the disclosure, there is provided a validator for verifying a digital signature in a video data segment.

According to a fifth aspect of the disclosure, there is provided a node device in a video delivery chain A common arrangement for providing video is by a linear video delivery chain that is formed by a video capturing device, having an image sensor, that captures video and by node devices that successively handle the video. In other words, video data segments are initially generated by a video capturing device and then transmitted between the plurality of node device in a successive order. The node devices may have the purpose of, for example, processing the video data segments in an automated manner or enabling a user to view or modify the video. Examples of node devices are video management system (VMS) devices, evidence management system (EMS) devices, image processing devices, and storage devices. The initial node device of the video delivery chain may be a camera, for example a monitoring camera, that comprises the video capturing device and one or more other processing devices. The video capturing device should thus be regarded as the device that acquires image sensor data and encodes the image sensor data into encoded image frames. The encoded image frames may then form a video data segment that is passed to a processing device of the camera which constitutes an initial node device of the video delivery chain. The processing device may add a node device dataset to the video data segment. A node device dataset is in the context of this application defined as a dataset generated by a node device. The node device dataset generated by the processing device is the first node device dataset added to the video data segment and can comprise for example a signature for the encoded image frames that is generated by the processing device based on parts of the encoded image frames. The parts may include all or a subset of the encoded image frames. The video data segment may thereafter be transmitted to the next node device in the video delivery chain, for example a VMS device, that in turn adds another node device dataset. The video data segment may be a part of one or more video data streams that are continuously generated by the video delivery chain. Node device datasets and encoded image frames of the video data segment may be transmitted in the same data stream or transmitted in different data streams. In particular, the encoded image frames may be transmitted as a part of a video stream and the node device datasets may be sent as a part of a separate metadata stream.

Node device datasets are separate from each other, meaning that the node device datasets are individually extractable from the video data segment independently from other datasets of the video data segment.

The video delivery chain comprises at least two node devices that add node device datasets to the video data segment. At least one of these node device datasets includes a signature. At least one of the signatures is generated based on parts of the encoded image frames. In other words, the video data segment is generated such that at least one signature is based on the encoded image frames, thus assuring that the encoded image frames can be validated. In addition, at least a first signature of the signatures in the video data segment is generated for a first node device dataset, not being the initial node device dataset, at a first node device and is based on a first number of node device datasets that have been last added to the video data segment before the first node device dataset. The first signature may be one of the at least one signatures that are based on the encoded image frames. Embodiments of different signature schemes in a video data segment will be disclosed in the detailed description.

By signature is meant a digital signature that is generated with the purpose of assuring the authenticity of the signed data. The digital signature can be seen as a fingerprint of the device that generates the signature. The digital signature is generated by use of a mathematical algorithm performed with the data to be signed as input. The output of the mathematical algorithm is the digital signature. Any mathematical algorithm that is suitable to use for the purpose of digital signing may be used in embodiments of the disclosure. The mathematical algorithm is typically based on a public key and private key pair scheme. A digital signature in that case is generated using a private key and verified using a corresponding public key. The mathematical algorithm may be selected from well-known signature schemes, for example RSA, ECC, DSA, ECDSA, EdDSA, ElGamal, and Schnorr.

According to the disclosure, the first digital signature of the first node device dataset, which is different from the initial node device dataset, is generated based on a first number of node device datasets of the plurality of node device datasets. Thus, a coupling between the first digital signature and a part of the video data segment other than the first node device dataset is created. The first number of node device datasets could be any number of datasets that have been last added before the first node device dataset, including all node device datasets that have been added to the video data segment before the first node device dataset, or only the node device dataset that has been added immediately before the first node device dataset. The first number may be a static predefined number, such as "2" or "1".

By that a digital signature is generated based on data is meant the digital signature signs at least that data. However, it does not exclude that the digital signature also signs further data. By way of example, that the claimed first digital signature is generated based on a first number of node device datasets does not exclude that it is further generated based on parts of the encoded image frames.

A strength of the proposed signing approach, which can be referred to as nested or chained signatures, is that the first digital signature cannot be verified only based on the first node device dataset. Other parts of the video data segment also need to be available to validate the authenticity of the node device dataset. This is the main purpose of the labels that are associated with the node device datasets. As defined, an order in which the plurality of node device datasets have been added to the video data segment is derivable from the labels. In that sense the labels may hence be said to be indicative of the order in which the node device datasets have been added to the video data segment. Thus, the first number of node device datasets can be identified using the labels. The first digital signature can then be verified based on the identified first number of node device datasets.

The disclosure is thus based on a concept that the plurality of node device datasets are labelled such that an order in which the plurality of node device datasets have been added to the video data segment is derivable. The order may be derivable from one or more labels considered alone, or considered in combination with further, supplemental, information. Detailed examples of different embodiments will be disclosed in the detailed description.

As appreciated by the skilled person, there are many alternatives with respect to the construction of labels to allow that the order in which the plurality of node device datasets have been added to the video data segment is derivable. On a general level, the labels can be defined as having a unique value that identify the node device dataset or the node device that has added the node device dataset. The value needs to be locally, not necessarily globally, unique. In other words, the unique value must identify the associated node device dataset among the plurality of node device datasets in the video data segment, but not necessarily among node device datasets of other video data segments. For example, a node device may associate different node device datasets in different video data segments with the same label.

As will be disclosed more in detail later, the value of the label can be set according to different rules in order to make it derivable. The label may be generated at a node device based on other labels that are already associated with previously added node device datasets to the video data segment as received at the node device. For example, the node device may generate a label with a value that is next in order of a number sequence. The labels would in that case form a sequence of increasing numbers corresponding to the order in which the associated node device datasets have been added to the video data segment. In another example, the node device may generate a label that includes one or more labels that are already present in the video data segment. For example, the generated label may, in addition to an identification of the current node device, include identifications of previous node devices in the video delivery chain. Specifically, the label may include an identification of the node device that is located immediately before the current node device in the video delivery chain.

Alternatively, the label may be generated at a node device independently of other labels. For example, the node device may generate a label that comprises an identification of the node device. The identification may be in the form of, for example, a sequence of numbers or letters. In order to identify the first number of node device datasets, there must be supplemental information available when independently generated labels are used. The supplemental information may for example comprise an order in which the node devices are located in the video delivery chain. From the supplemental information in combination with labels identifying the node devices, the order in which the associated node device datasets have been added can be derived. The supplemental information may be added as a part of the video data segment or may be information that is decided on beforehand for the video delivery chain and is available as separate data from the video data segment.

By associating a label to a node device dataset is meant that there is provided a logical connection between the label and the node device dataset. The logical connection may be achieved by including a reference in the associated label to the node device dataset, or vice versa. In other words, the associated label may comprise a reference to which node device dataset it is associated, by for example a handle or a pointer. Thus, when the validator has identified the label, it can quickly determine the associated node device dataset from the reference. Correspondingly, the node device dataset may comprise a reference, such as a handle or a pointer, to the associated label. Alternatively, the logical connection may be provided by a lookup table (LUT) which associates labels with node device datasets. The LUT can be a part of the video data segment and updated by a node device when adding a node device dataset.

Preferably, the label itself is added as part of the associated node device dataset. The node device dataset may hence be said to be tagged by the label. For example, the label may be included at predetermined bit positions within the associated node device dataset. This allows the label to be easily located and separately read out from a node device dataset.

A specific example of how to add a label is as a part of user data unregistered supplemental enhancement information (SEI) message. SEI messages are a known frame component specified in the H.264 and H.265 video compression standards. An SEI message, or SEI frame, has predefined parts. A user data unregistered SEI frame comprises the parts header, size, UUID, and payload. In one embodiment, the label is added as part of the UUID. In another embodiment, the label is added as beginning or ending bits of the payload. Both these embodiments provide an efficient labelling in that no separate data frames need to be created for the labels.

In one embodiment, an additional security measure is added to the signature process in order to obstruct that the node device dataset that has been added last to the video data segment is maliciously removed. The node device generating the node device dataset may for this purpose encrypt a digital signature of the video data segment that has been added to the video data segment last before the node device dataset. Thus, the digital signature needs to be decrypted before being verified. The decryption may be an operation that can be performed only by the node device that has performed the encryption. The node device may also add information to its node device datasets indicating that encryption has been performed. In this embodiment, the method of verifying a digital signature may further comprise, prior to the verification of the digital signature, decrypting the digital signature using a decryption key associated with the encryption key. The decryption may comprise requesting the node device that has encrypted the signature to perform decryption or to provide the decryption key. The method may further comprise detecting that the digital signature is encrypted and identifying the node device that has performed the decryption. The node device may be identified by identifying the node device dataset that has been added next in order after the node device dataset that has an encrypted signature. The identified node device dataset may comprise a reference to its node device, for example as part of a label comprised therein.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF DRAWINGS

The disclosure will now be described in more detail by way of example and with reference to the accompanying schematic drawings, in which.

DETAILED DESCRIPTION

Figure 1:
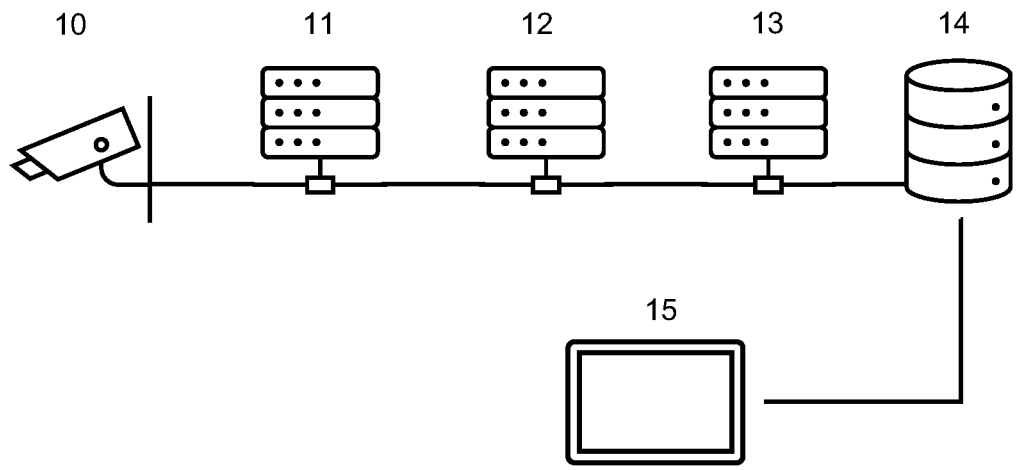
FIG. 1 illustrates a video delivery chain.

The disclosure concerns methods of adding digital signatures to a video data segment and methods of verifying these signatures. The video data segment is generated by a linear video delivery chain as illustrated in FIG. 1. The video delivery chain is defined by a number of node devices 10-14. The node devices include a camera 10, a VMS device 11, an EMS device 12, a video processing device 13, and a storage device 14. The video delivery chain begins with a video capturing device which in the illustrated example is part of the camera 10. The video capturing device comprises an image sensor for acquiring video in the form of image data. The video capturing device further comprises a video encoder arranged to generate encoded image frames from the acquired image data. The encoder may be configured to perform prediction-based video encoding according to any known video compression standard including H.264 and H.265. Prediction-based encoded image frames include intra frames and inter frames. Intra frames, also known as I frames, are data structures with independently decodable image data which can be decoded into a plaintext video frame by means of a predefined associated decoding operation. Inter frames, also known as P or B frames, are data structures that are dependent on other image frames in order to be decoded.

In the illustrated example, the video delivery chain comprises five node devices. For the purpose of the disclosure, the video delivery chain needs to comprise two or more node devices, for example one camera and one VMS device.

A general purpose of the disclosure is to provide methods of adding one or more digital signatures to the video data segment. The digital signatures provide a possibility to validate the data in the video data segment. The data that is used as a basis when generating a digital signature is referred to as signed data. All data of the video data segment do not need to be signed, however at least a part of the encoded image frames need to be signed in order to provide a useful validation of the video data segment. If the encoded image frames cannot be validated, there is in most cases no point in being able to validate other data such as additional data added by the node devices. For example, if the video data segment is to be used as evidence in a court, a basic requirement is that the image frames of the video data segment can be trusted. The encoded image frames are validated by verifying a signature that is generated based on the encoded image frames. Thus, a characteristic of the video delivery chain is that at least one of the node devices generates a signature that is based on parts of the encoded image frames. The parts can include some encoded image frames or parts of every encoded image frame, or all encoded image frames as a whole. In a preferred embodiment, the signature that is added first of all signatures to the video data segment is based on parts of the encoded image frames.

The validation, including verifying the signatures, of the video data segment may be performed by a validator 15. The validation may be performed long after the video data segment has been generated. A typical scenario is that the video data segment is generated by the video delivery chain and long-term stored in the storage device 14. When validation is required, for example in the case of using the video data segment as evidence, the video data segment is transmitted from the storage device 14 to the validator 15 for verifying the signatures.

Figure 2A:
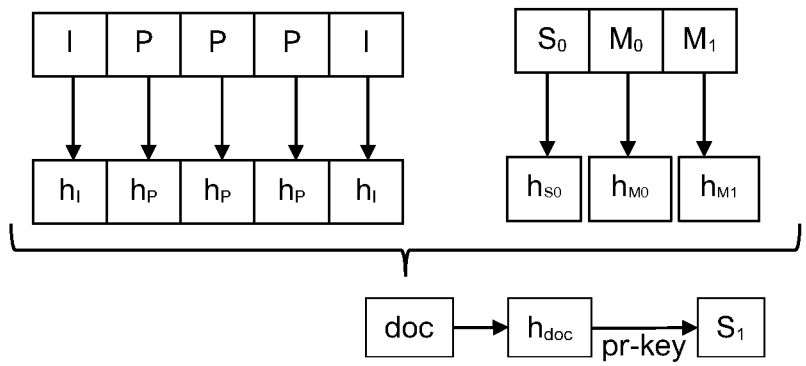
FIGS. 2A-2C illustrates an example of how to generate and verify digital signatures, FIGS. 3A-6C' illustrate different video data segment generated according to embodiments of the disclosure.
Figure 2B:
Figure 2C:
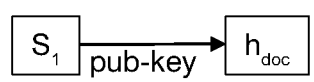

A general example of how to generate and add a signature to a video data segment will now be disclosed with further reference to FIGS. 2A-2C.

In FIG. 2A, the video data segment as generated by the camera 10 is illustrated. The video data segment is here illustrated as two groups of data items: one group of image frames and one group of node device datasets. The video data segment, i.e., the groups of data items, may be sent in a single or in multiple data streams. In one example, a single data stream is formed with all data items. The order in which the data items are positioned in the data stream may differ between implementations. Typically, the image frames are sent first, followed by signatures and metadata being part of the node device datasets. In another example, a pair of streams are formed wherein a first stream includes the encoded image frames and a second stream includes the node device datasets. The pair of streams may be arranged in a file having a container format for being transmitted between node devices or for long-term storage in a storage device.

The encoded image frames of the video data segment may comprise one or more group of pictures (GOP) of intra- and inter-encoded image frames. The encoded image frames are exemplified as a single and short GOP herein for alleviating the understanding of the inventive concept. The explained concepts are, however, easy for a skilled person to apply to more complex GOP structures, for example GOP structures including bidirectional predicted pictures (B-frames).

The video data segment in the illustrated example includes encoded images frames denoted I and P, and a node device dataset which includes a digital signature $S_0$ and metadata $M_0$. The encoded image frames have been generated in the video capturing device of the camera 10. The camera 10 has also generated the metadata $M_0$ comprising, for example, information about camera firmware or image processing parameters that should be transmitted with the encoded image frame. In addition, the camera 10 has generated the digital signature $S_0$ based on the encoded image frames and on the metadata $M_0$. Thus, the encoded image frames and the metadata $M_0$ have been signed by the camera 10 before being transmitted to the VMS device 11. The camera 10 has inserted the digital signature $S_0$ and the metadata $M_0$ into the video data segment. As will be exemplified below, there are embodiments where the camera 10 does not generate a signature or metadata.

The VMS device 11 that receives the video data segment may allow a user to view the video data segment and, for example, add information in the form of metadata $M_1$ to the video data segment. The metadata may represent, for example, time stamps, overlays, or notes. The VMS device 11 may also add information in the form of metadata indicating software or firmware information or time stamps. The data that the VMS device 11 adds to the video data segment, including any signature, forms a node device dataset. The node device dataset added by a single node device, in this case the VMS device 11, may be located at various places in the video data segment and be formed by a plurality of data units. For example, different data frames may be used for transmitting data of the node device dataset. For simplicity, node device datasets will herein be illustrated as a pair of data packages or data units denoted with S for signature, if any signature is generated, and M for metadata, if any metadata is generated, of the node device dataset.

To be able to validate the authenticity of the metadata $M_1$ that the VMS device 11 has added to the video data segment, the VMS device 11 generates a digital signature $S_1$ and adds it to the video data segment. The digital signature $S_1$ is generated as illustrated in FIG. 2A. First, each of the I and P frames are hashed, using a conventional hashing algorithm, to form hashed images frames hi and hp. The digital signature $S_0$ and the metadata $M_0$ are also hashed, as well as the metadata $M_1$ that has been generated by the VMS device 11. The hashed image frames, signature and metadata are assembled in a document doc, which in turn is also hashed, i.e., subjected to a hashing algorithm, to produce a hash $h_{doc}$. The digital signature $S_1$ is thereafter generated by inputting the hash $h_{doc}$ into a signature algorithm. In this example, the signature algorithm uses a private key pr-key held by the VMS device 11 to generate the digital signature $S_1$ since the signature algorithm is based on the use of a public and private key pair. The digital signature $S_1$ is inserted together with the metadata $M_1$ into the video data segment.

FIG. 2B illustrates the video data segment as it is composed at the different node devices VMS device 11 (top), EMS device 12 (center), and video processing device 13 (bottom). The EMS device 12 has added a digital signature $S_2$ and metadata $M_2$. The video processing device 13 has added a digital signature $S_3$ and metadata $M_3$. At the next node device, i.e., storage device 14, a further node device dataset may be added. The signatures $S_2$ and $S_3$ may be generated in an analogous manner as exemplified for the signature $S_1$. It is appreciated that the position of node device dataset components, such as signatures and metadata, may be located at other positions in the video data segment than illustrated. In addition, the encoded image frames and the node device datasets may be transmitted as part of different data streams.

The signatures $S_0$, $S_1$, $S_2$, $S_3$ are generated to enable validation of the encoded image frames and the node device datasets' authenticity. By verifying one of the signatures, the signed data is validated. A signature may be verified by decrypting it using the public key that is connected to a corresponding signature algorithm and compare the result with a self-determined value that is generated according to the same principle as the signature. For example, FIG. 2C illustrates decryption of the signature $S_1$ using a public key pub-key, thus determining a hashed document $h_{doc}$. This document can be determined by the validator 15 from the components of the video data segment that was used by the VMS device 11 to generate the signature $S_1$. However, a problem is that since the video data segment has passed by additional node devices since the VMS device 11, and been expanded with additional node device datasets, the validator 15 does not know which data items of the video data segment that the VMS device 11 had access to when generating the signature $S_1$. Thus, the validator 15 does not know which data items of the video data segment to use for determining a hashed document for comparison with the decrypted signature S1. This is where the inventive concept comes into play.

According to the concepts set forth herein, each node device that adds a node device dataset to the video data segment, also associates the node device dataset with a label. The label may be associated by adding the label to the video data segment according to a predetermined rule for adding labels. The validator 15, which knows the rule, can thereby localize labels, and know which datasets that the respective labels are associated with. The labels are constructed such that the order in which the node device datasets have been added is derivable from the labels. In some embodiments, additional information may be required for deriving the order and such information is available in these embodiments at the validator 15.

Hence, thanks to the labels, the validator 15 can identify which node device datasets were available for a certain node device when generating a signature. The validator 15 also has prior knowledge of which of these available node device datasets the certain node device used as basis for its signature, e.g., if all available node device datasets or only specific ones of them were included in the signature.

In other words, it is predetermined for a given video delivery chain that signature should be generated based on a first number of node device datasets that have been last added to the video data segment previous in order. It may also be determined that signatures should be based on other parts of the video data segment, such as parts of the encoded image frames or the dataset generated by the node device itself.

It is an advantage if the label is added in an unencrypted manner, i.e., without being subjected to encryption. The validator 15 does then not need to have access to a key for unlocking the label before being able to read its content. Such an unencrypted, intelligible format of the label may be referred to as plaintext. In other words, the label may be added to the video data segment, wherein the label has a plaintext format. A more detailed example of how labels can be inserted into the video data segment will be given later with reference to FIG. 10.

Accordingly, the labels are introduced for being able to derive an order in which node device datasets have been added to the video data segment. There are multiple approaches to how the labels can be set up to allow for deriving the order. Five examples will now be disclosed.

In a first example, each node device is assigned an identification. The identification may be in the form of a static value or static tag that indicates the identity of the node device. The identification is inserted into a label which is associated with the node device dataset that is added to the video data segment by the node device. When validating the video data segment, the validator 15 identifies an order in which node device datasets have been added to the video data segment using the labels and further using supplemental information indicating a predetermined transmission order of the video data segment through the video delivery chain. In other words, the predetermined transmission order indicates in which order node devices of different identifications are successively arranged in the video delivery chain. In a variant of this first example, the label also includes identifications of all previous node devices in the video delivery chain. The previous node devices are the node devices that have handled the video data segment before the current node device. The identifications of the previous node devices may be determined by a current node device by locating the labels of the video data segment. Alternatively, in some embodiments the current node device may locate a label having the highest number of identifications since this label should include all previous identifications. With this variant, the order in which the node device datasets were added can be derived from the labels alone without any supplemental information.

In a second example, each node device is assigned an identification. The identification may be in the form of static data, such as a static value or a static tag, that indicates the node device type. The label including the identification is associated with the node device dataset that is added to the video data segment by the node device. When validating the video data segment, the validator 15 identifies an order in which node device datasets have been added to the video data segment using the labels and further using supplemental information indicating a predetermined transmission order with respect to node device types for the video delivery chain. Thus, from the predetermined transmission order, the validator 15 knows in which order the node device types were arranged in the video delivery chain. For example, the camera 10 may have an identification "10", the VMS device 11 may have an identification "23", and the EMS device may have an identification "37". The identifications may be setup such that a value in the interval of 10-19 indicates that the node device is a camera device, a value in the interval of 20-29 indicates that the node device is a VMS device, and a value in the interval of 30-39 indicates that the node device is an EMS device. If there are several node devices that are VMS devices, these may use different identifications in the interval 20-29 for VMS devices. In addition, the validator 15 knows from the supplemental information in which node type order the node devices of the current video delivery chain is arranged. More specifically, the validator 15 knows that the video delivery chain begins with a camera device, followed by VMS device(s), EMS device(s), and ends with a storage device.

In a third example, each node device generates a label that comprises an identification of the node device in the form of a dynamic value that is generated based on labels that have been added by previous node devices in the video delivery chain.

To generate the dynamic value, the node device identifies already present labels in the video data segment and generates a label comprising a value that is different from the values of the identified labels in the video data segment. The identification may be a random number that is not equal to any of the values of the identified labels. The label may be generated to also include one or more identifications that have been found in the identified labels of the received video data segment. Specifically, at least the identification in the label that has been added by the immediately preceding node device may be added. In other words, the label comprises an identification of the current node device and an identification of a node device that added a node device dataset immediately before the node device dataset associated with the current label.

By including labels from one or more preceding node devices, it is possible for the validator 15 to derive the order in which node device datasets have been added to the video data segment based on the labels without any additional information. In examples where the node device generates a label based on identifications of already present labels in the received video data segment, the node device may be arranged to wait until it has received a number of consecutive GOPs before generating its label. This since there may be labels added by previous node devices that are added for only some GOPs. By waiting a number of video data segments, the risk of generating a label having an identification doublet, i.e., the same identification that is already present in a label generated and added to the video data segment by a previous node device, may be reduced.

In a fourth example, that is a variant of the third example, a node device generates a label that comprises an identification in the form of a value that by itself indicates the order in which node device datasets are added to the video data segment. One example of such a labelling scheme is to use numbers as labels and that the node device chooses the next number in a sequence of increasing numbers found in the already added labels. For example, a node device finds labels with identifications 001, 002, and 003. The node device then selects the following number 004 to be comprised as identification in its label. An advantage with this labelling scheme is that no additional information is needed in the labels or at the validator 15. By knowing which labelling scheme is used, the validator 15 can derive the order in which the node device datasets have been added to the video data segment from the labels without additional information.

In a fifth example, each node device adds the non-signature part of its node device dataset, referred to as metadata above, as the first data part of the video data segment. In other words, the node device dataset is transmitted first to the next node device before the rest of the video data segment. The node device dataset is also labelled with a unique label, for example a value or a tag, to separate the node device dataset from the other node device datasets in the final video data segment. Since all node devices adds its node device dataset according to the same principle, the resulting video data segment will begin with an ordered sequence of labelled node device datasets that corresponds to the reverse order in which the node device datasets were added. Accordingly, the first node device dataset in the ordered sequence at the beginning of the video segment was added last and the last labelled node device dataset in the ordered sequence was added first. The corresponding signatures may be added at another part of the video data segment and be labelled with the same label as the rest of its node device dataset. For example, data units of a video data segment that is transmitted in a single stream may be arranged like this:

$M_3 \ M_2 \ M_1 \ M_0 \ I \ P \ P \ P \ I \ S_0 \ S_1 \ S_3$ wherein $M_X$ represents metadata, $S_X$ represents signatures, and I, P represent encoded image frames.

Correspondingly, in an embodiment where the node device datasets in a separate stream, the data units of the node device datasets may be arranged like this:

$M_3 \ M_2 \ M_1 \ M_0 \ S_0 \ S_1 \ S_3$

From the order of the labelled node device datasets at the beginning of the video segment together with their labels it is possible to derive the order in which the node device datasets were added to the video segment. For example, it is possible to identify that node device datasets labelled with the same label as any one of M2, M1, M0 (including S1 and S0) were added before node device datasets labelled with the same label as M3 (including S3).

The inventive concept of labelling for enabling generating and verifying signatures for different node device datasets added by different node devices is applicable to various embodiments of signature schemes and video data segment structures. Four different embodiments will now be disclosed with reference to FIGS. 3A-6C' to exemplify these variations. The figures illustrate structures of video data segment as obtained by a validator 15 that is arranged to verify the signatures therein in order to validate the encoded image frames and one or more node device datasets. In other words, the video data segments are illustrated in a fully generated state. It is however appreciated that the video data segments have been generated successively by node device of a video delivery chain as described above. The node device datasets of the embodiments are labelled according to any of the exemplified labelling schemes above. Thus, each node device dataset in the embodiments is associated with a label, wherein the order in which the plurality of node device datasets have been added is derivable from the labels.

Figure 3A:
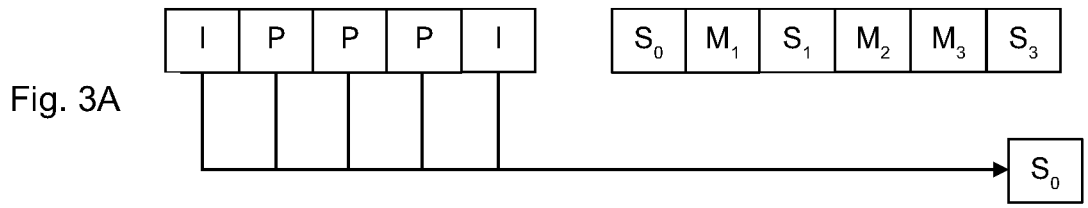
Figure 3B:
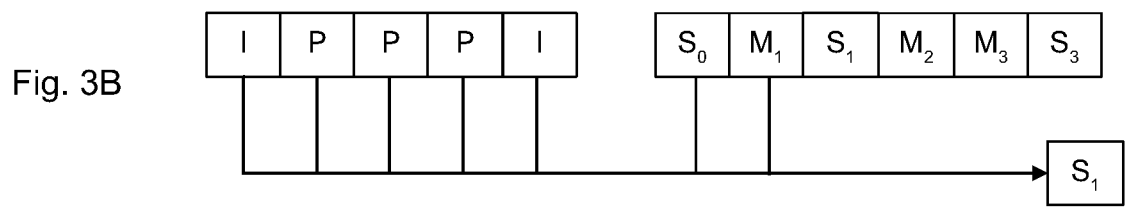
Figure 3C:
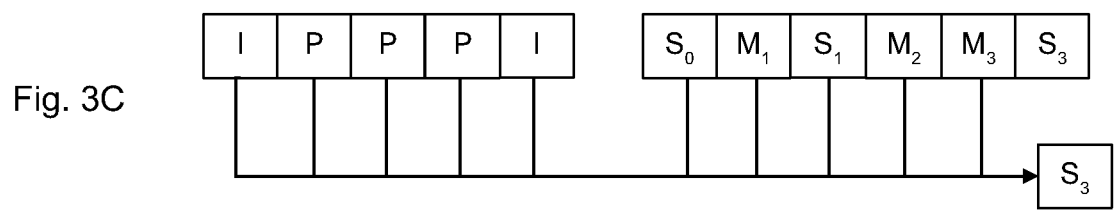

A first embodiment will now be disclosed with reference to FIGS. 3A-3C which illustrates a video data segment which includes encoded image frames and a plurality of node device datasets $(S_0)$, $(M_1, S_1)$, $(M_2)$, $(M_3, S_3)$ which successively have been added to the video data segment. The signature scheme in this embodiment is that a signature is generated by a node device based on the encoded image frames, or at least parts thereof, and all node device datasets of the video data segment as received at a node device and also based on any metadata generated at the current node device. The encoded image frames include all inter and intra encoded images frames of one GOP and the first intra encoded image frame of the next GOP.

This signature scheme may be visualized as an envelope structure where a first envelope seals the encoded image frames by signature $S_0$, a second envelope seals the first envelope together with a node device dataset by signature $S_1$, and so on.

Thus, in this case three node device datasets $(S_0)$, $(M_1, S_1)$, $(M_3, S_3)$ each includes a digital signature which is based on the encoded image data. The digital signature in each of the node datasets $(M_1, S_1)$, $(M_3, S_3)$ is further based on a number of node device datasets that were the last ones to be added before the concerned node device dataset. Specifically, the signature $S_1$ is further based on the last added node device dataset $(S_0)$, and the signature $S_3$ is based on the three last added node device datasets $(S_0)$, $(M_1, S_1)$, $(M_2)$. Any one of the node device datasets $(M_1, S_1)$, $(M_3, S_3)$, may hence be considered as the first or the second node device dataset mentioned in the attached claims. For example, ($M_1$, $S_1$) may be considered as the first node device dataset, and ($M_3$, $S_3$) may be considered as the second node device dataset. The digital signatures in node device datasets ($M_1$, $S_1$) and ($M_3$, $S_3$) are still further based on the metadata M1 and M3, respectively.

At the validator 15, the signatures $S_0$, $S_1$, $S_3$ are now to be verified. For this purpose, the validator 15 locates the labels which are associated with the node device datasets. As defined, a node device dataset is formed by all data that a single node device adds to the video data segment. Data frames, or data units, of the node device dataset added by a single node is in the figures denoted by a same number. For example, $M_1$ and $S_1$ belong to the same node device dataset and are associated with the same label.

For each signature $S_0$, $S_1$, and $S_3$, the validator 15 identifies, using the labels, all node device datasets that have been added to the video data segment before the node device dataset that comprises the signature. For $S_0$, there are no previously added node device datasets identified. The validator 15 thus verifies the signature $S_0$ based on only the encoded image frames as illustrated in FIG. 3A. For $S_1$, there is one node device dataset identified, namely the one that includes the signature $S_0$. The validator 15 thus verifies the signature $S_1$ based on the encoded image frames, the signature $S_0$, and the metadata $M_1$, as illustrated in FIG. 3B. Metadata added by a same node device can be determined by identifying labelled data of a same node device dataset that is not a digital signature. For $S_3$, the validator 15 identifies three node device datasets that have been added to the video data segment before the node device dataset comprising the signature $S_3$. The validator 15 thus verifies the signature $S_3$ based on the encoded image frames, the signatures $S_0$ and $S_1$, and the metadata $M_1$, $M_2$, and $M_3$, as illustrated in FIG. 3C.

As noted, there is a node device dataset comprising only metadata $M_2$ without any signature. In this embodiment, one node device of the video delivery chain has added a node device dataset that comprises only metadata and not any signature. The node device dataset formed by $M_2$ is, however, still labelled according to the inventive concept.

Figure 4A:
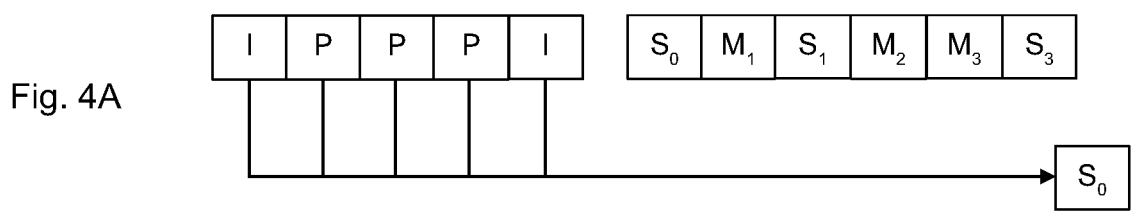
Figure 4B:
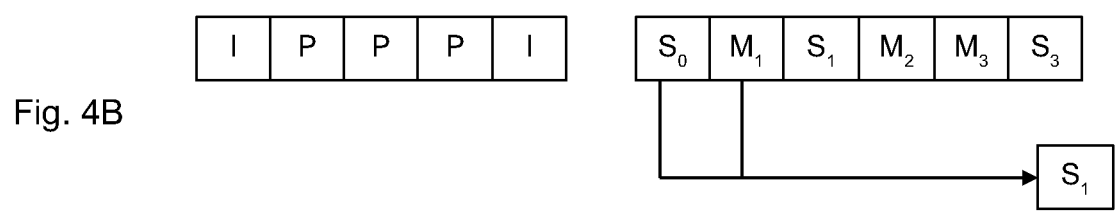
Figure 4C:
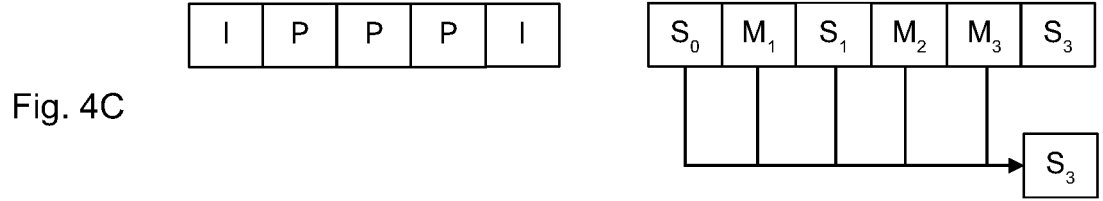

A second embodiment will now be disclosed with reference to FIGS. 4A-4C which illustrates a video data segment which includes encoded image frames and a plurality of node device datasets ($S_0$), ($M_1$, $S_1$), ($M_2$), ($M_3$, $S_3$) which successively have been added to the video data segment.

The signature scheme in this embodiment is that the initial node device of the video delivery chain, typically a camera, generates a signature based on the encoded image frames, and that the rest of the node devices generates signatures based on all previously added node device datasets, thus excluding the encoded image frames in the generation of the signature.

Thus, in this case three node device datasets ($S_0$), ($M_1$, $S_1$), ($M_3$, $S_3$) each includes a digital signature, whereof only the digital signature S0 that was first added to the video segment is based on the encoded image data. The digital signature in each of the node device data sets ($M_1$, $S_1$), ($M_3$, $S_3$) is based on a number of node device datasets that were the last ones to be added before the concerned node data set. Specifically, the signature $S_1$ is based on the last added node device dataset ($S_0$), and the signature $S_3$ is based on the three last added node device datasets ($S_0$), ($M_1$, $S_1$), ($M_2$). Any one of the node device datasets ($M_1$, $S_1$), ($M_3$, $S_3$), may hence be considered as the first or the second node device dataset mentioned in the attached claims. For example, ($M_1$, $S_1$) may be considered as the first node device dataset, and ($M_3$, $S_3$) may be considered as the second node device dataset. The digital signatures in node device datasets ($M_1$, $S_1$) and ($M_3$, $S_3$) are further based on the metadata $M_1$ and $M_3$, respectively.

As in the first embodiment, it is not mandatory for a node device to generate a signature but every node device dataset that is added to the video data segment must be labelled in accordance with the inventive concept.

For each signature $S_0$, $S_1$, and $S_3$, the validator 15 identifies all node device datasets that have been added to the video data segment before the node device dataset that comprises the signature. For $S_0$, there are no previously added node device datasets identified. The validator 15 thus concludes that the signature $S_0$ is added by the initial node device and verifies the signature $S_0$ based on only the encoded image frames as illustrated in FIG. 4A. For $S_1$, there is one node device dataset identified, namely the one that includes the signature $S_0$. The validator 15 thus verifies the signature $S_1$ based on the signature $S_0$ and the metadata $M_1$, as illustrated in FIG. 4B. For $S_3$, the validator 15 identifies three node device datasets that have been added to the video data segment before the node device dataset comprising the signature $S_3$. The validator 15 thus verifies the signature $S_3$ based on the signatures $S_0$ and $S_1$, and the metadata $M_1$, $M_2$, and $M_3$, as illustrated in FIG. 4C.

Figure 5A:
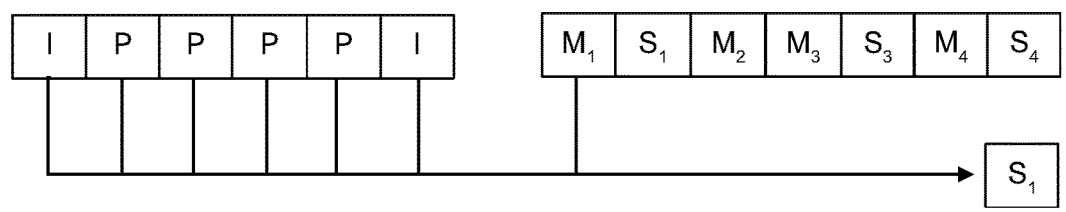
Figure 5B:
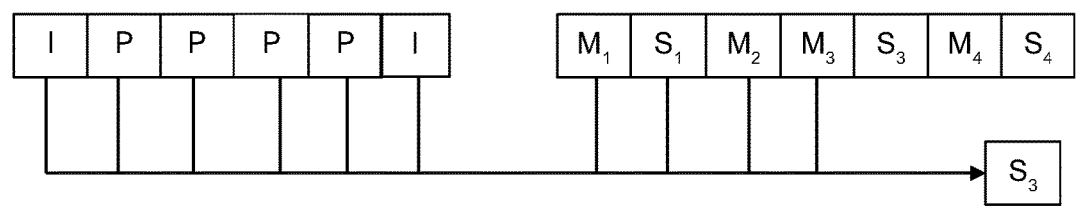
Figure 5C:
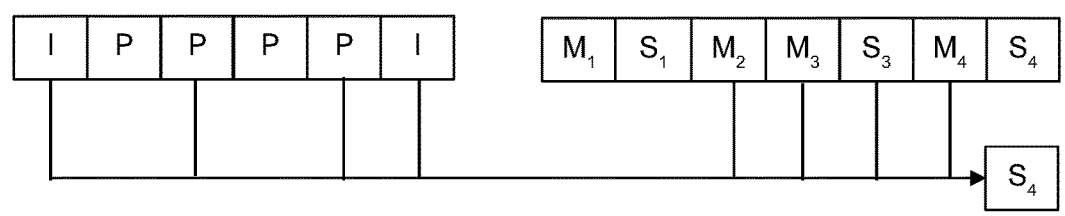

A third embodiment will now be disclosed with reference to FIGS. 5A-5C, which illustrates a video data segment which includes encoded image frames and a plurality of node device datasets ($M_1$, $S_1$), ($M_2$), ($M_3$, $S_3$), ($M_4$, $S_4$) which successively have been added to the video data segment.

The signature scheme in this embodiment is that a signature is generated based on the two node device datasets that have been last added to the video data segment before the current node device dataset, and in addition based on selected parts of the encoded image frames. Information indicating which parts that have been selected may be added as metadata in the current node device dataset. Thus, in this embodiment the validator 15 needs to identify the labels and an indication of which selected parts of the encoded image frames that a signature has been generated based on in order to verify the signature.

In this case three node device datasets ($M_1$, $S_1$), ($M_3$, $S_3$), ($M_4$, $S_4$) hence each includes a digital signature which signs part of the image frames. The digital signature node device data sets ($M_3$, $S_3$), ($M_4$, $S_4$) are further based on two node device datasets that were the last ones to be added before the concerned node data set. Specifically, the signature $S_3$ is further based on the two last added node device datasets ($M_1$, $S_1$), ($M_2$) and the signature $S_4$ is based on the two last added node device datasets ($M_2$), ($M_3$, $S_4$). Any one of the node device datasets ($M_3$, $S_3$), ($M_4$, $S_4$), may hence be considered as the first or the second node device dataset mentioned in the attached claims, and the first number and second number mentioned in the claims is equal to two. For example, ($M_3$, $S_4$) may be considered as the first node device dataset, and ($M_4$, $S_4$) may be considered as the second node device dataset. The digital signatures in node device datasets ($M_3$, $S_3$) and ($M_4$, $S_4$) are further based on the metadata $M_3$ and $M_4$, respectively.

It is noted that in this embodiment the initial node device, i.e., the camera, has not generated a signature. The encoded image frames are thus transmitted to the next node device, for example a VMS device, in an unsigned format. However, since it is likely that at least some of the node devices generate a signature based on the encoded image frames, the authenticity of the encoded image frames will likely be possible to validate from the signatures.

For each signature $S_1$, $S_3$, and $S_4$, the validator 15 identifies the two node device datasets that have been last added to the video data segment before the node device dataset that comprises the signature. The validator 15 also identifies the parts of the encoded image frames that have been used for generating the signature.

For $S_1$, there are no previously added node device datasets identified. The current node device dataset indicates that all encoded image frames have been used for generating the signature. The validator 15 thus verifies the signature $S_1$ based on the encoded image frames and the metadata $M_1$, as illustrated in FIG. 5A. For $S_3$, there are two node device datasets identified, and the node device dataset comprising the signature $S_3$ indicates that no encoded image frames have been used when generating the signature $S_3$. The validator 15 thus verifies the signature $S_3$ based on the metadata $M_1$, $M_2$, and $M_3$, and the signature $S_1$. For $S_4$, the two node device datasets that have been last added to the video data segment are identified, and the node device dataset comprising the signature $S_4$ indicates the parts of the encoded image frames that have been used for generating the signature $S_4$. Thus, the validator 15 verifies the signature $S_4$ based on the metadata $M_2$, $M_3$, and $M_4$, the signature $S_4$, and on the selected encoded image frames, as illustrated in FIG. 5C.

Figure 6A:
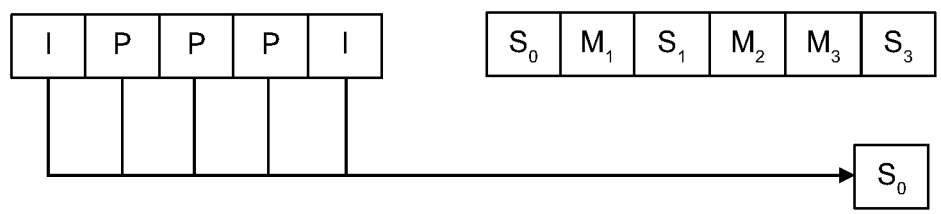
Figure 6B:
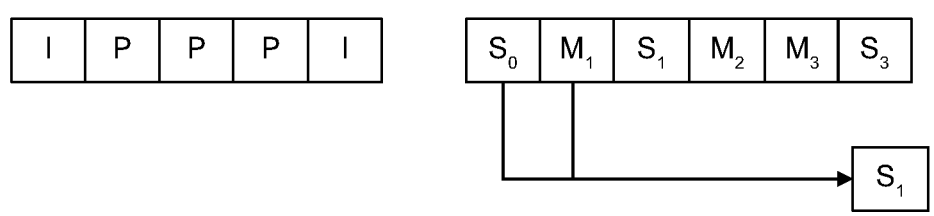
Figure 6C:
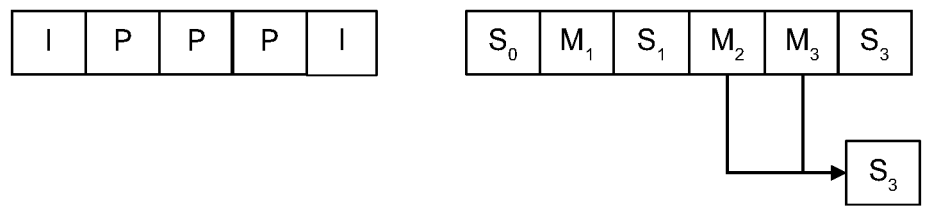
Figure 6C:
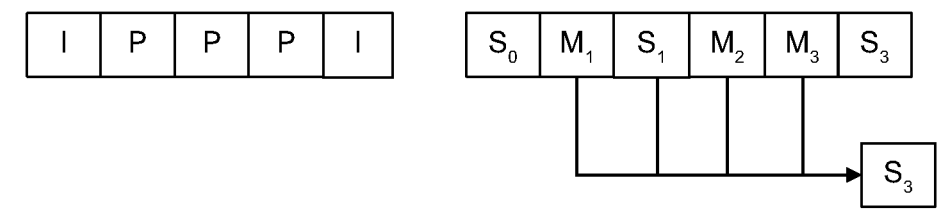

A fourth embodiment will now be disclosed with reference to FIGS. 6A-6C' which illustrates a video data segment which includes encoded image frames and a plurality of node device datasets $(S_0)$, $(M_1, S_1)$, $(M_2)$, $(M_3, S_3)$ which successively have been added to the video data segment. The signature scheme in this embodiment is that an initial signature, the signature that is first added to the video data segment and generated at the initial node device of the video delivery chain, is generated based on the encoded image frames. Following signatures that are added to the video data segment are each generated based on the (one) node device dataset that has been last added to the video data segment before the node device dataset of the current node device.

Thus, in this case three node device datasets $(S_0)$, $(M_1, S_1)$, $(M_3, S_3)$ each includes a digital signature, whereof only the digital signature $S_0$ that was first added to the video segment is based on the encoded image data. The digital signature in each of the node device data sets $(M_1, S_1)$, $(M_3, S_3)$ is based on one node device dataset that was the last one to be added before the concerned node data set. Specifically, the signature $S_1$ is based on the last added node device dataset $(S_0)$, and the signature $S_3$ is based on the last added node device dataset $(M_2)$. Any one of the node device datasets $(M_1, S_1)$, $(M_3, S_3)$, may hence be considered as the first or the second node device dataset mentioned in the attached claims, and the first and the second number mentioned in the claims is equal to one. For example, $(M_1, S_1)$ may be considered as the first node device dataset, and $(M_3, S_3)$ may be considered as the second node device dataset. The digital signatures in node device datasets $(M_1, S_1)$ and $(M_3, S_3)$ are further based on the metadata $M_1$ and $M_3$, respectively.

The validator 15 identifies the signature $S_0$ and verifies it based on the encoded image frames, as illustrated in FIG. 6A. For each of the other signatures, i.e., signatures $S_1$ and $S_3$, the validator 15 identifies the one node device dataset that is last added to the video data segment before the node device dataset comprising the signature. The validator 15 then verifies each of the signatures based on the respective identified node device dataset, as illustrated in FIGS. 6B and C.

In a variant of the fourth embodiment, the following signatures that are added to the video data segment are each generated based on a number of node device datasets that were last added to the video data segment before the node data set added by the current node device. The number of node device datasets includes the node device dataset with the previously added signature, and any node device dataset which were added thereafter. Following this signature scheme, the signature $S_1$ in the illustrated example of FIG. 6B signs one node device dataset, while the signature $S_3$ instead signs three node device datasets, as illustrated in FIG. 6C'. This variant, in which the encoded image frames is signed somewhere in the video delivery chain and each signature is based on at least one other signature, has the advantage that no node device dataset or encoded image frame can be removed without it being detected when verifying the chained signatures. Thus, the authenticity of the encoded image frames and the node device datasets, including that they are coupled to each other, can be verified. Thus, the embodiment of FIGS. 6A-B-C' is preferred over the embodiment of FIGS. 6A-B-C.

From a validator 15 perspective, the signature $S_3$ of the node device dataset $(M_3, S_3)$ is verified by identifying, using the labels, the previous node device dataset that has been added immediately before the node device dataset $(M_3, S_3)$. Upon concluding that there is no signature present in the node device dataset being added immediately before the first node device dataset, the validator 15 identifies the node device dataset being added one further step before according to the labels. The validator 15 thereby identifies the node device dataset that includes $M_1$ and $S_1$. The first signature $S_3$ is then verified by the validator 15 based on the identified node device datasets and based on the metadata $M_3$.

As illustrated in FIGS. 3A-6C', the validator 15 may be arranged to verify multiple signatures. In the illustrated examples, all signatures that are identified in the video data segment are verified. However, the validator 15 may be arranged to verify a subset of the identified signatures. Reasons for such a configuration may be that only some parts of the video data segment are interesting to validate, for example only the encoded image frames and a node device dataset added by an EMS device. Another reason may be that the validator 15 has access to only a subset of public keys required for decrypting the signatures. The inventive concept based on labelling may allow for validation of parts of the video data segments by verifying a subset of signatures and does not require that all signatures be verified or that the signatures be verified in a particular order. The concepts also allow parallel verification of multiple signatures in the video data segment. For example, the validator 15 may perform the verification processes illustrated in FIGS. 3A-3C and FIGS. 6A-6C in parallel. In other words, the video data segment may be fed to three parallel validation processes which are configured to verify signatures generated by different node devices of the video delivery chain. The order in which node device datasets have been added to the video data segment may be derived beforehand. The first number of node device datasets that have been added to the video data segment before each node device dataset may be identified centrally in the validator 15 and sent as information to respective validation process.

Figure 7:
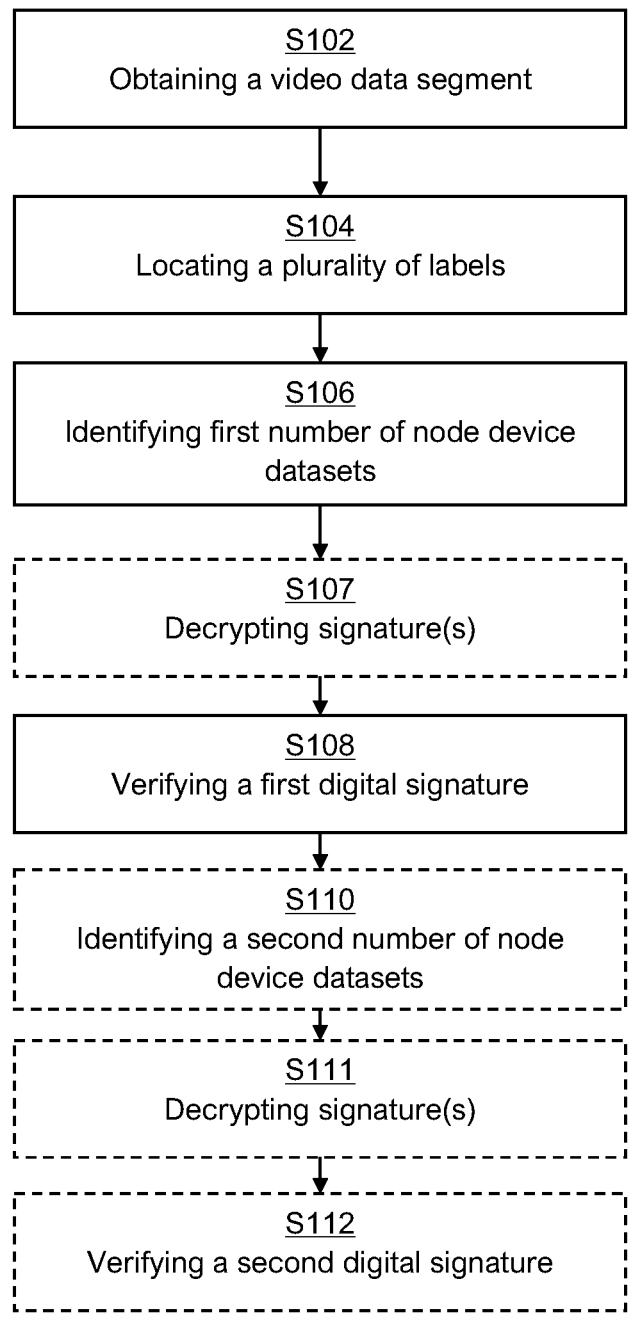
FIG. 7 illustrates a method of verifying digital signatures according to an embodiment of the disclosure.

FIG. 7 illustrates a summary of the method for verifying a first digital signature in a video data segment, as exemplified in the above. The method may be performed by a validator 15. In a first step S102, the video data segment is obtained, for example from a storage device. The first signature comprised in a first node device dataset is identified. In a next step S104, the plurality of labels in the video data segment is located. In a next step S106, a first number of node device datasets that have been last added to the video data segment before the first node device dataset are identified. The first number of node device datasets may range from one to all previous node device datasets. As exemplified, the first number may be a specified value, for example "1" or "2", or be an unspecified value, for example "all" or "all which were added starting from the previous signature but before the current signature".

In a next optional step S107, it is determined if any signature of the first number of node device datasets is encrypted and, in that case, decrypting the one or more signatures. This step is performed in an embodiment where one or more node devices, preferably the last node device in the video delivery chain, encrypts the digital signature of the video data segment that has been added to the video data segment last before the node device dataset of the node device. For example, in the embodiment of FIGS. 3A-3C, this would correspond to that the node device that generates the signature $S_3$ also encrypts the signature $S_1$. In order to verify the encrypted signature, the validator 15 needs to decrypt it. The step of decrypting S107 a signature may comprise requesting the node device that has encrypted the signature to perform decryption or to provide the decryption key. For this purpose, the validator 15 may perform a step of identifying the node device that has performed the decryption. The node device may be identified by identifying the node device dataset that has been added next in order after the node device dataset that has an encrypted signature. The identified node device dataset may comprise a reference to its node device, for example as part of a label comprised therein. An advantage gained by the encryption is that the node device dataset of the encrypting node device cannot be removed from the video data segment unnoticed. When trying to decrypt the encrypted signature, the validator 15 would in that case fail to identify the encrypting node device, since the corresponding node device dataset has been removed, and the validator 15 would fail to verify the encrypted signature. The validator 15 would thereby detect that the video data segment has been changed, possibly due to tampering. This advantage is particularly strong in case at least the last node device of the video delivery chain performs the encryption. In the example of FIG. 1, the encryption would in that case be performed by the storage device 14.

In a next step S108, the first digital signature is verified based on the identified first number of node device datasets, and on any additional data if specified by a signature scheme that the first signature is generated based on.

The method may comprise further steps of verifying further signatures of the video data segment. For example, a second node device dataset comprises a second digital signature. As a next step S110 in the method, a second number of node device datasets that have been last added to the video data segment before a second node device dataset are identified. In a next step S111, any signature of the second number of node device datasets may be decrypted in a corresponding manner as in step S107. As a next step S112, the second digital signature is verified based on the second number of node device datasets identified in step S110. The second number of node device datasets may be the same number of node device datasets as the first number of node device datasets, depending on which signature scheme that is used.

Figure 8:
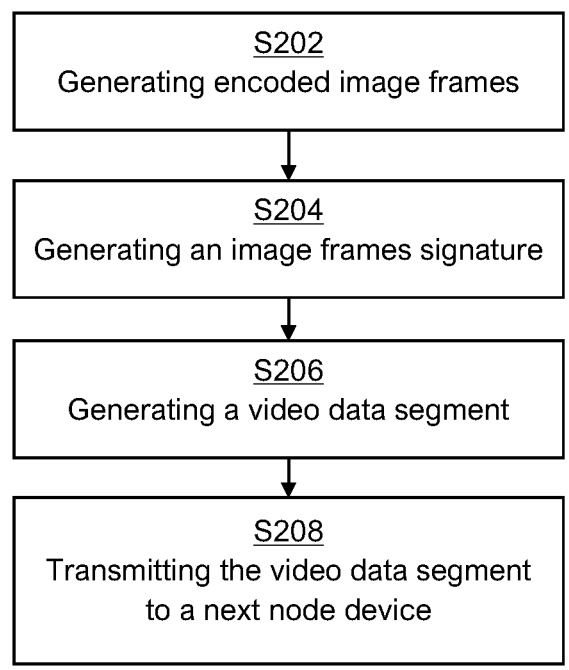
FIG. 8 illustrates a method of generating a video data segment in a camera.
Figure 9:
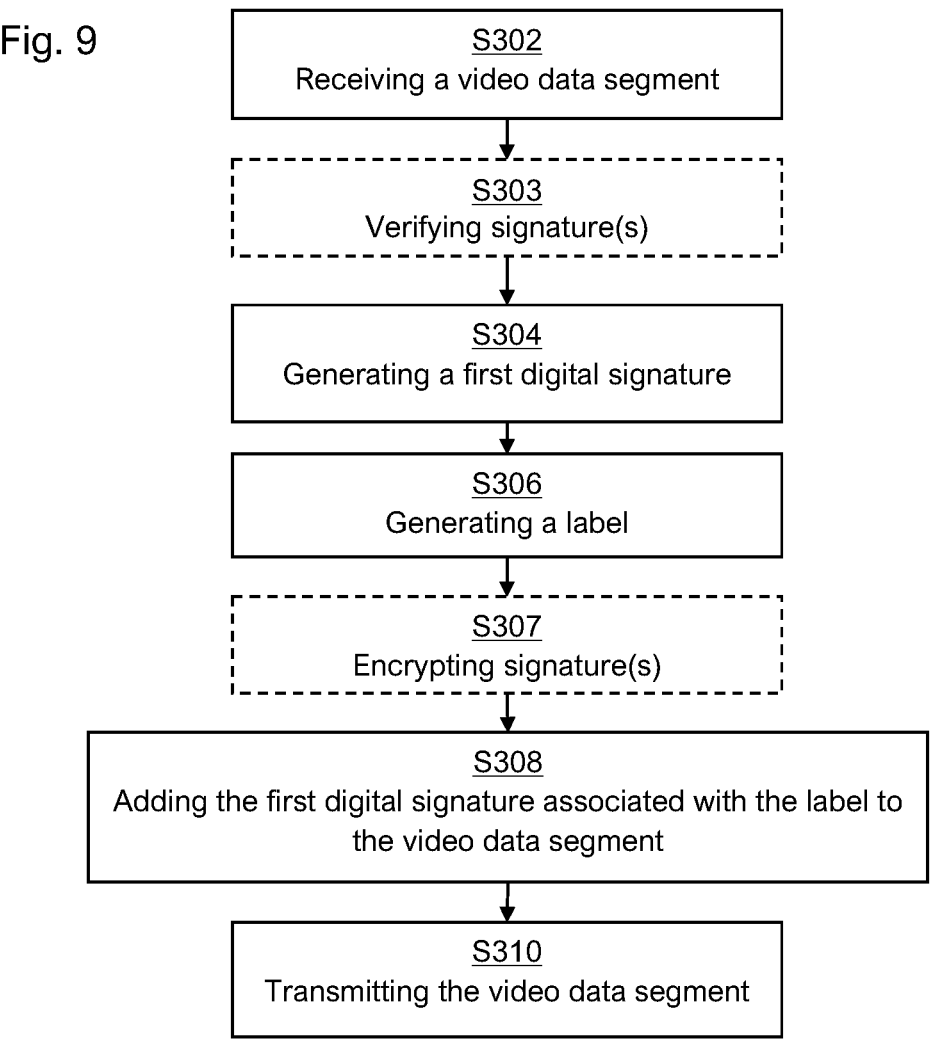
FIG. 9 illustrates a method of adding a digital signature to a video data segment at a node device according to an embodiment.

FIGS. 8 and 9 illustrate methods included in the generation of a video data segment according to embodiments of the disclosure. FIG. 8 illustrates a method as performed in a video capturing device and an initial node device of a video delivery chain. The video capturing device may be part of the initial node device. The initial node device may be camera 10 of FIG. 1. In a first step S202, encoded image frames are generated by acquiring image data and encoding the image data into encoded image frames. This step S202 is performed by the video capturing device. In a next step S204, an initial digital signature for the encoded image frames is generated. The initial signature may be referred to as an image frames signature or video signature. As a next step S206, a video data segment is formed. The video data segment includes the encoded image frames and the initial digital signature. The steps S204 and S206 may be performed by a processor of the initial node device to which the encoded image frames have been transmitted from the video capturing device. In a next step S208, the video data segment is transmitted to a next node device in the video delivery chain.

FIG. 9 is a method that may be performed by the next node device that receives the video data segment from the initial node device. The method may also be performed by any of the following node devices in the video delivery chain. Accordingly, a first step S302 comprises receiving the video data segment. In a next optional step S303, one or more signatures of the received video data segment are verified to make sure that the received video data segment is authentic. The node device may generate metadata indicating the validation result, in particular if the validation fails, to be included in its node device dataset. It is particularly desirable to validate the encoded image frames of the video data segment. This can be done by verifying signatures that are based on parts of the encoded image frames. If the validation fails, thus indicating that the encoded image frames are not authentic, the node device may generate metadata describing the validation result, for example that one encoded image frame is missing due to packet losses during the transmission of the video data segment or due to other reasons. The generated metadata from this step S303 may be used by later node devices when verifying the video data segment or at a later stage to determine where in the video delivery chain that a change in the video data segment has occurred.

As a next step S304, a first digital signature is generated based on a first number of node device datasets according to a preset signature scheme as exemplified above. As a next step S306, a label is generated or obtained. The label may be generated based on labels that have already been added to the video data segment. In a next optional step S307, the signature in the first number of node device dataset that has been added to the video data segment last before the node device dataset is encrypted. The signature may be encrypted by any suitable known encryption algorithm.

The node device preferably generated metadata comprising information, for example in the form of a flag, indicating that encryption has been performed and which signatures, if not all, of the first number of node device datasets that have been encrypted. Additionally, the information may include an address to a decrypting device, i.e., the unit that the validator 15 should turn to for decrypting the encrypted signature.

In a next step S308, the first digital signature, and optionally metadata, including any information relating to the optional encryption, is added to the video data segment as a first node device dataset. The node device associated the first node device dataset with the label and, optionally, adds the label to the first node device dataset. In a next step S310, the video data segment is transmitted to the node device next in order in the video delivery chain. Alternatively, if the node device is the last one in the video delivery chain, the step S310 may comprise storing the video data segment in a long-term storage device. The long-term storage device may form the last node device of the video delivery chain, as illustrated in FIG. 1.

Figure 10:
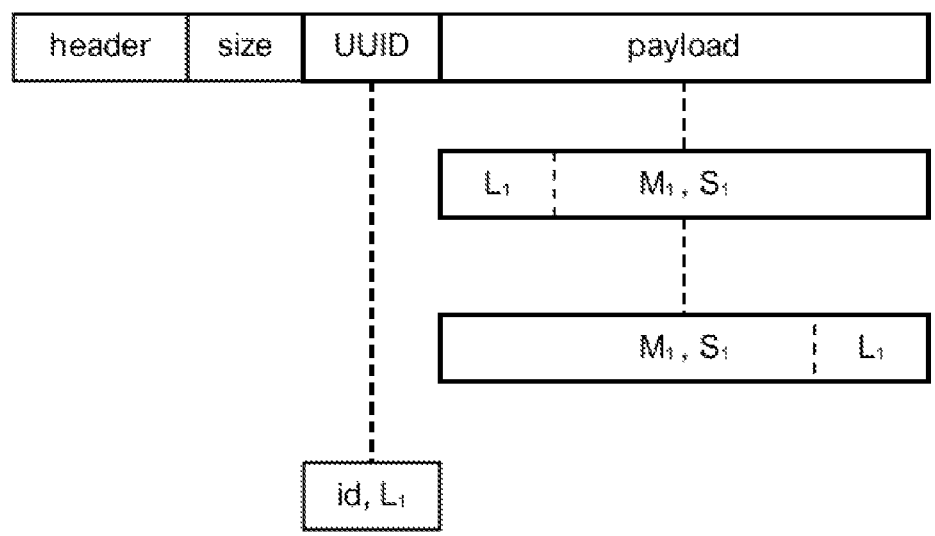
FIG. 10 illustrates different SEI messages.

An example of how a label $L_1$ can be added to an associated node device dataset will now be disclosed with reference to FIG. 10. In one embodiment, user data unregistered SEI messages are utilized as data units. SEI messages is a known frame component specified in the H.264 and H.265 video compression standards. An SEI message, or SEI frame, has predefined parts. A user data unregistered SEI frame comprises the parts header, size, UUID, and payload, as illustrated in FIG. 10. In one embodiment, the label $L_1$ is added as part of the UUID. The UUID may comprise both an id and the label $L_1$ arranged in a preset order. The id defined the type of data that the SEI message contains in its payload. The id may for example indicate that the SEI message carries signed video data, i.e., embedded image frame data with a corresponding signature. In another embodiment, the label $L_1$ is added as beginning or ending bits of the payload. As disclosed, it is preferred that the label $L_1$ is not encrypted and thus of an intelligible format. A node device dataset may comprise a plurality of SEI messages, each comprising the label $L_1$. For example, metadata $M_1$ and a digital signature $S_1$ may be included in different SEI messages. It is appreciated that other message or frame formats are possible to utilize and that a label can be comprised in such other formats as well.

The method of verifying a digital signature may be implemented in a validator 15, being a computer, having a processor which in association with computer code instructions stored on a non-transitory computer-readable medium, such as a non-volatile memory, causes the processor to carry out any method of verifying a digital signature as disclosed herein.

The method of adding a digital signature to a video data segment may be implemented in any type of node device having a processor which in association with computer code instructions stored on a non-transitory computer-readable medium, such as a non-volatile memory, causes the processor to carry out any method of adding a digital signature to a video data segment as disclosed herein.

Examples of non-volatile memory include read-only memory, flash memory, ferroelectric RAM, magnetic computer storage devices, optical discs, and the like.

The invention claimed is:

1. A method for verifying a digital signature in a video data segment, wherein the video data segment is generated by a video delivery chain defined by a video capturing device and a plurality of node devices, comprising:
   obtaining the video data segment, the video data segment comprising encoded image frames, generated by the video capturing device, and a plurality of node device datasets successively generated and added to the video data segment by the plurality of node devices,
   wherein the plurality of node device datasets are associated with respective labels from which an order in which the plurality of node device datasets have been added to the video data segment is derivable,
   wherein one or more node device datasets in the plurality of node device datasets include respective digital signatures of which at least one is generated based on parts of the encoded image frames,
   wherein the one or more node device datasets comprises a first node device dataset which includes a first digital signature generated by a first node device based on a first number of node device datasets of the plurality of node device datasets that have been last added to the video data segment before the first node device dataset,
   locating the labels in the obtained video data segment,
   identifying, using the labels, the first number of node device datasets that have been last added to the video data segment before the first node device dataset, and
   verifying the first digital signature based on the identified first number of node device datasets.

2. The method according to claim 1,
   wherein the first node device dataset further includes first metadata generated by the first node device,
   wherein the first digital signature is further generated based on the first metadata, and
   wherein the step of verifying the first digital signature is further based on the first metadata.

3. The method according to claim 1, wherein a digital signature included in a node device dataset that has been added first to the video data segment among said one or more node device datasets is generated based on parts of the encoded image data.

4. The method according to claim 1,
   wherein the first digital signature is further based on parts of the encoded image frames, and
   wherein the step of verifying the first digital signature is further based on the parts of the encoded image frames.

5. The method according to claim 1,
   wherein the one or more node device datasets further comprises a second digital signature generated by a second node device based on a second number of node device datasets of the plurality of node device datasets that have been last added to the video data segment before the second node device dataset,
   and wherein the method further comprises
   identifying, using the labels, the second number of node device datasets that have been last added to the video data segment before the second node device dataset, and
   verifying the second digital signature based on the identified second number of node device datasets.

6. The method according to claim 1,
   wherein each label comprises an identification of a node device that added the node device dataset associated with the label, and
   wherein the first number of node device datasets that have been last added to the video data segment before the first node device dataset are identified by further using a predetermined transmission order of the video data segment through the video delivery chain.

7. The method according to claim 1, wherein each label comprises an identification of a node device that added the associated node device dataset and an identification of a node device that added a node device dataset immediately before the associated node device dataset.

8. A method of adding a digital signature to a video data segment at a first node device included in a plurality of node devices which define a video delivery chain, the method comprising:

receiving, at the first node device, a video data segment comprising encoded image frames and one or more node device datasets that have been successively generated and added to the video data segment by node devices of the plurality of node devices, wherein the one or more node device datasets are associated with respective labels from which an order in which the one or more node device datasets have been added to the video data segment is derivable, generating a first digital signature based on a first number of node device datasets of the one or more node device datasets that have been last added to the received video data segment, adding a first node device dataset comprising the first digital signature to the video data segment, and associating the first node device dataset with a first label from which it is derivable that the first node device dataset has been added to the video data segment next in order after the one or more node device datasets.

9. The method according to claim 8, further comprising generating metadata, wherein the first node device dataset further comprises the generated metadata, and wherein the first digital signature is further generated based on the metadata.

10. The method according to claim 8, wherein at least one node device dataset among the one or more node device datasets of the received video data segment includes a digital signature generated based on parts of the encoded image frames.

11. The method according to claim 8, wherein the first digital signature generated by the first node device is further generated based on parts of the encoded image frames.

12. The method according to claim 8, further comprising, prior to generating the first digital signature, encrypting at least a part of a node device dataset that has been last added to the received video data segment.

13. The method according to claim 8, wherein the first label comprises an identification of the first node device.

14. The method according to claim 13, wherein the first label further comprises an identification of a node device that was last to add a node device dataset to the received video data segment.

15. A non-transitory computer readable storage medium having stored thereon instructions for implementing a method for verifying a digital signature in a video data, when executed on a device having processing capabilities, wherein the video data segment is generated by a video delivery chain defined by a video capturing device and a plurality of node devices; the method comprising:

obtaining the video data segment, the video data segment comprising encoded image frames, generated by the video capturing device, and a plurality of node device datasets successively generated and added to the video data segment by the plurality of node devices, wherein the plurality of node device datasets are associated with respective labels from which an order in which the plurality of node device datasets have been added to the video data segment is derivable, wherein one or more node device datasets in the plurality of node device datasets include respective digital signatures of which at least one is generated based on parts of the encoded image frames, wherein the one or more node device datasets comprises a first node device dataset which includes a first digital signature generated by a first node device based on a first number of node device datasets of the plurality of node device datasets that have been last added to the video data segment before the first node device dataset, locating the labels in the obtained video data segment, identifying, using the labels, the first number of node device datasets that have been last added to the video data segment before the first node device dataset, and verifying the first digital signature based on the identified first number of node device datasets.

16. A node device in a video delivery chain, comprising a processor configured to perform a method of adding a digital signature to a video data segment at a first node device included in a plurality of node devices which define a video delivery chain, the method comprising:

receiving, at the first node device, a video data segment comprising encoded image frames and one or more node device datasets that have been successively generated and added to the video data segment by node devices of the plurality of node devices, wherein the one or more node device datasets are associated with respective labels from which an order in which the one or more node device datasets have been added to the video data segment is derivable, generating a first digital signature based on a first number of node device datasets of the one or more node device datasets that have been last added to the received video data segment, adding a first node device dataset comprising the first digital signature to the video data segment, and associating the first node device dataset with a first label from which it is derivable that the first node device dataset has been added to the video data segment next in order after the one or more node device datasets.

* * * * *